United States Patent [19]
Lee

[11] Patent Number: 6,051,098
[45] Date of Patent: Apr. 18, 2000

[54] KEYBOARD ETCHING APPARATUS

[75] Inventor: Kevin Lee, Chung Li, Taiwan

[73] Assignee: Behavior Tech Computer Corp., Taipei, Taiwan

[21] Appl. No.: 08/916,923

[22] Filed: Aug. 22, 1997

[51] Int. Cl.[7] ..................................................... C23F 1/02
[52] U.S. Cl. .......................... 156/345; 414/211; 414/467; 414/507; 414/212
[58] Field of Search ...................... 118/719, 718, 118/729, 723 R; 156/345; 204/298.23, 298.24, 298.25, 298.35; 414/209, 211, 212, 222, 467, 507, 787, 939

[56] References Cited

U.S. PATENT DOCUMENTS

| | | | |
|---|---|---|---|
| 5,468,111 | 11/1995 | Flint et al. | 414/416 |
| 5,597,609 | 1/1997 | Beisswenger et al. | 427/8 |

*Primary Examiner*—Richard Bueker
*Assistant Examiner*—Luz Alejandro
*Attorney, Agent, or Firm*—Rosenberg, Klein & Lee

[57] ABSTRACT

A keyboard etching apparatus includes a base on which a frame is fixed to support a laser beam source and a keyboard tray thereon to be spaced from each other in such a manner to allow a laser beam emitted from the laser beam source to project onto a keyboard removably supported on the keyboard tray for performing etching operation on the keyboard. A keyboard supply cart having a plurality of non-etched keyboards held therein and a keyboard collecting cart for collecting etched keyboards are respectively arranged on two opposite sides of the frame and movable along rails fixed on the base. A conveyor system is arranged between the keyboard supply cart and the keyboard collecting cart for sequentially moving each of the non-etched keyboards received in the keyboard supply cart to the keyboard tray to be etched by the laser beam and to simultaneously move the etched keyboard from the keyboard tray to the keyboard collecting cart to be collected therein.

9 Claims, 5 Drawing Sheets

KEYBOARD ETCHING APPARATUS

FIELD OF THE INVENTION

The present invention relates to a keyboard etching apparatus for etching the keys of the keyboard so as to form desired characters/marks thereon and in particular to a laser-based etching apparatus which allows automatically and sequentially loading, etching and unloading a number of keyboards so as to perform the etching operation in an efficient and precise manner.

BACKGROUND OF THE INVENTION

Computers have a variety of input devices among which keyboard is the most common and basic one. By depressing the keys of the keyboard, the characters/marks represented by the keys are entered. Conventionally, the characters/marks that the keys represent for are printed on the keys which after a long term operation will gradually fade and become unidentifiable due to being constantly contacted and rubbed by computer users' fingers. Thus, etching, especially laser etching, is adapted to form the characters/marks on the keys of the keyboard which provides a more durable service life of the keys.

The laser etching apparatus, which is generally computer or micro-processor based, generally comprises a base on which a machine frame is fixed. A laser and a keyboard tray are provided on the machine frame to be opposite to and spaced from each other. A "blank" keyboard which, as used herein, is intended to indicate a keyboard having keys that have not yet been laser-etched is manually positioned on the keyboard tray which is in general located on the bottom of the machine frame. The operator may then control the laser to perform laser etching operation on the keys of the keyboard on the keyboard tray. The etched keyboard is then manually removed out of the keyboard tray. This completes the etching operation of one keyboard. This is quite in-efficient. Further, besides moving and positioning the keyboard, the operator has to watch the etching operation on the keys and to properly set operation parameters of the etching apparatus. This is inconvenient and ineffective. Once the etching operation is completed, the operator has to manually take it out of the keyboard tray and to position a new blank keyboard into the keyboard tray.

Due to so much labor needed in the keyboard etching operation using the conventional etching apparatus, it is very costly and time-consuming. Further, since the operator has to stay in the proximity of laser etching apparatus during the etching operation, damages to the operator's body are frequently known.

It is thus desirable to provide a keyboard etching apparatus which is capable to carry out the etching operation in a fully automatic manner so as to overcome the above discussed problems encountered in the prior art keyboard etching apparatus.

SUMMARY AND OBJECTS OF THE INVENTION

Therefore, the primary object of the present invention is to provide an automatic keyboard etching apparatus which is fully automatically operated so as to provide a high efficiency and high precision keyboard etching operation with only very limited human labor needed.

Another object of the present invention is to provide an automatic keyboard etching apparatus which is fully automatic so as to reduce the likelihood of damage to operator.

A further object of the present invention is to provide an automatic keyboard etching apparatus which is equipped with keyboard supply device and keyboard collecting device with a conveyor system connecting therebetween so as to automatically transfer keyboard between the keyboard supply device and the etching apparatus and between the etching apparatus and the keyboard collecting device to enhance the operation efficiency of the keyboard etching apparatus in operating on a plurality of keyboards.

A further object of the present invention is to provide a keyboard etching apparatus which may comprise a computer or micro-processor based controller so as to allow ready modification of the etching operation to accommodate keyboards of different specifications.

To achieve the above objects, in accordance with the present invention, there is provided a keyboard etching apparatus comprising a base on which a frame is fixed to support a laser beam source and a keyboard tray thereon to be spaced from each other in such a manner to allow a laser beam emitted from the laser beam source to project onto a keyboard removably supported on the keyboard tray for performing etching operation on the keyboard. A keyboard supply cart having a plurality of non-etched keyboards held therein and a keyboard collecting cart for collecting etched keyboards are respectively arranged on two opposite sides of the frame and movable along rails fixed on the base. A conveyor system is arranged between the keyboard supply cart and the keyboard collecting cart for sequentially moving each of the non-etched keyboards received in the keyboard supply cart to the keyboard tray to be etched by the laser beam and to simultaneously move the etched keyboard from the keyboard tray to the keyboard collecting cart to be collected therein. A computer or microprocessor based controller may be adapted to automatically control the conveyance and etching operation so that the human labor needed may be greatly cut down. This not only saves cost, but also reduces the likelihood of human body damage.

BRIEF DESCRIPTION OF THE DRAWINGS

The above and other objects, advantages and features of the present invention will be readily apparent from the following detailed description of a preferred embodiment of the invention, with reference to the accompanying drawings, wherein.

DETAILED DESCRIPTION OF THE PREFERRED EMBODIEMNT

Figure 1:
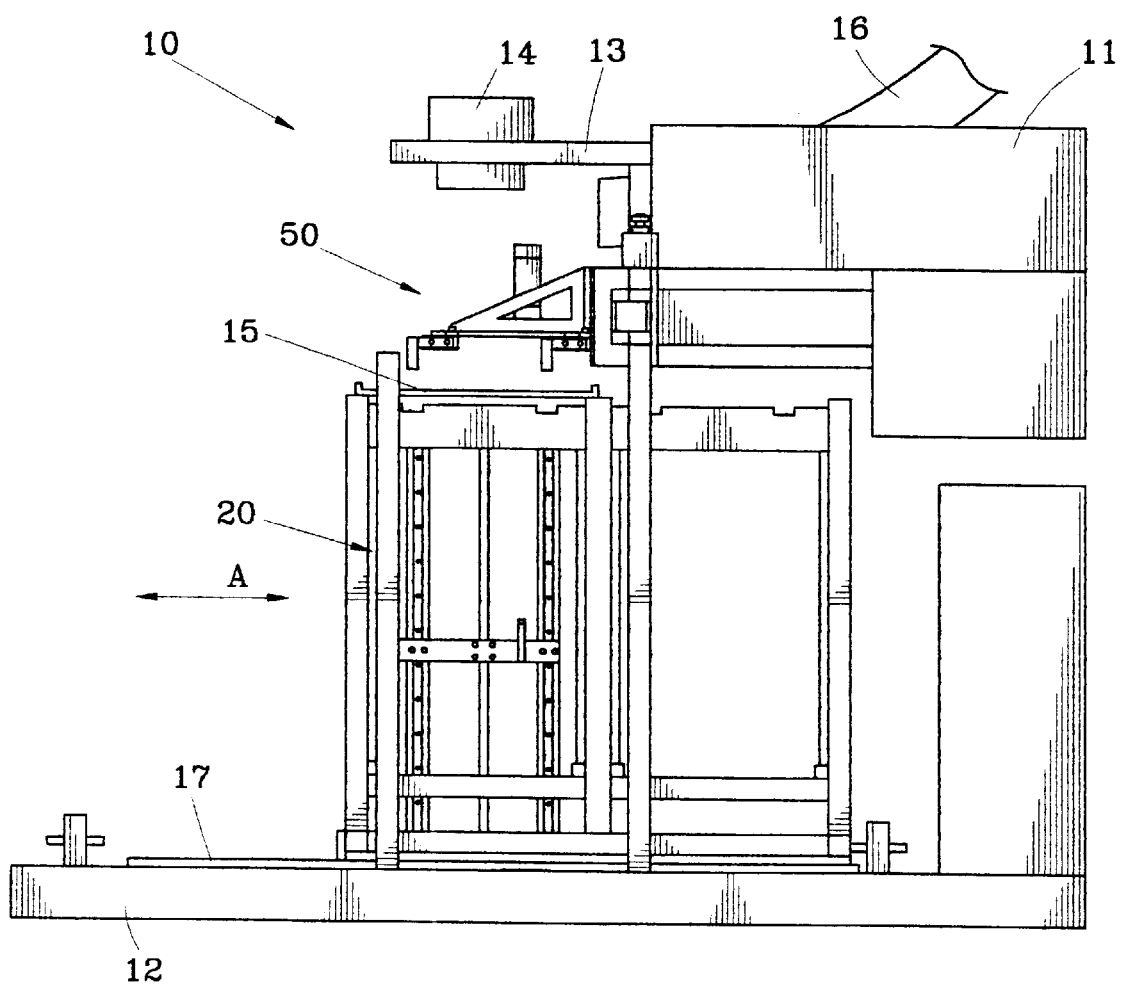
FIG. 1 is a side elevational view showing a keyboard etching apparatus constructed in accordance with the present invention.
Figure 2:
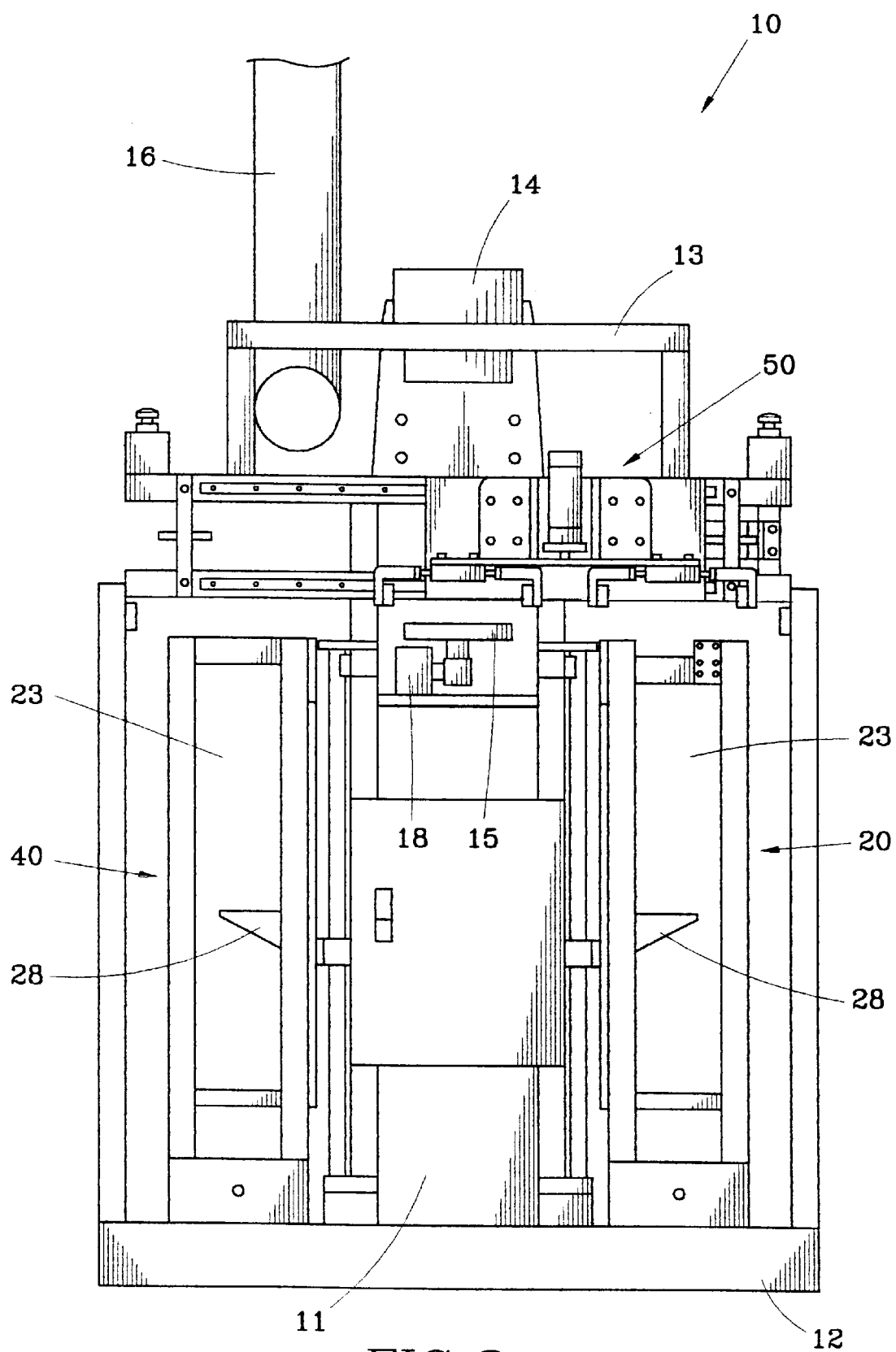
FIG. 2 is a front view of the keyboard etching apparatus of the present invention.

With reference to the drawings and in particular to FIGS. 1 and 2, wherein a keyboard etching apparatus constructed in accordance with the present invention, generally designated with reference numeral 10, is shown, the keyboard etching apparatus 10 comprises a machine frame 11 mounted on a base 12 to support a keyboard tray 15 and a laser 14 on a front side thereof. The keyboard tray 15 is to support thereon a keyboard on which an etching operation is to be performed. The etching operation itself is known and does not constitute a novel part of the present invention so that no detail will be given herein.

The keyboard etching apparatus 10 also comprises a keyboard supply device and a keyboard collecting device respectively provided on two opposite lateral sides of the machine frame 11. The keyboard supply device comprises a pair of rails 17 fixed on the base 12 and located at one of the two opposite lateral sides of the machine frame 11 and extending in a front-rear direction and a keyboard supply cart 20 guided by and movable along the rails 17. The keyboard supply cart 20 has a plurality of keyboards that are not etched and will be referred to as blank keyboard. The keyboard collecting device is provided on the other lateral side of the machine frame 11 to be opposite to the keyboard supply device, comprising a pair of rails 17 fixed on the base 12 and located at the other lateral side of the machine frame 11 and extending in a front-rear direction, preferably parallel with the rails 17 of the keyboard supply device and a keyboard collecting cart 40 guided by and movable along the rails 17. The keyboard collecting cart 40 is to receive keyboards that have been etched from the etching apparatus 10. The machine frame 11 is thus located between the keyboard supply device and the keyboard collecting device and a grasping mechanism 50 is provided to be mounted to the machine frame 11 for conveying blank keyboard from the key supply cart 20 to the keyboard tray 15 to be etched thereon and conveying the etched keyboard from the keyboard tray 15 to the keyboard the keyboard collecting cart 40.

As shown in FIGS. 1 and 2, the machine frame 11 has a support arm 13 disposed above and extending beyond the machine frame 11 in the front side to support the laser 14. The keyboard tray 15 is disposed below the laser 14 with a predetermined spacing therebetween and is movable by means of a power cylinder 18 (see FIG. 2) that is mounted on the machine frame 11 for adjusting the relative position between the keyboard tray 15 and the laser 14 in order to perform the laser etching operation in a more precise manner. The keyboard tray 15 support a keyboard 70 (see FIG. 5, but not shown in FIGS. 1 and 2) in such a way to allow a laser beam from the laser 14 to project onto the keyboard 70 for carrying out the etching operation and thus forming desired characters/marks on the keyboard 70.

A gas exhausting tube 16 is disposed at one side of the machine frame 11, having an inlet opening facing the space between the keyboard tray 15 and the laser 14 for removing and expelling the undesired gas generated during the etching operation.

The grasping mechanism 50 is arranged between the laser 14 and the keyboard tray 15 and located between the keyboard supply cart 20 and the keyboard collecting cart 40 to be movable between the keyboard supply cart 20 and the keyboard collecting cart 40 to sequentially and one-by-one pick up keyboards 70 from the keyboard supply cart 20 and position the keyboard 70 onto the keyboard tray 15 and at the same time when picking up the keyboard 70 from the keyboard supply cart 20, picks up the keyboard 70 that is originally positioned on the support tray 15 and has been etched by the laser 14 and forwards the keyboard to the keyboard collecting cart 40.

The keyboard supply cart 20 and the keyboard collecting cart 40 may have the same structure and the one that carries blank keyboards is referred to as the keyboard supply cart 20, while the other one that receives and collects the etched keyboards the keyboard collecting cart 40. To simplify the description, only the keyboard supply cart 20 that is particularly shown in FIG. 3 will be described in detail and the description is also applicable to the keyboard collecting cart 40.

Figure 3:
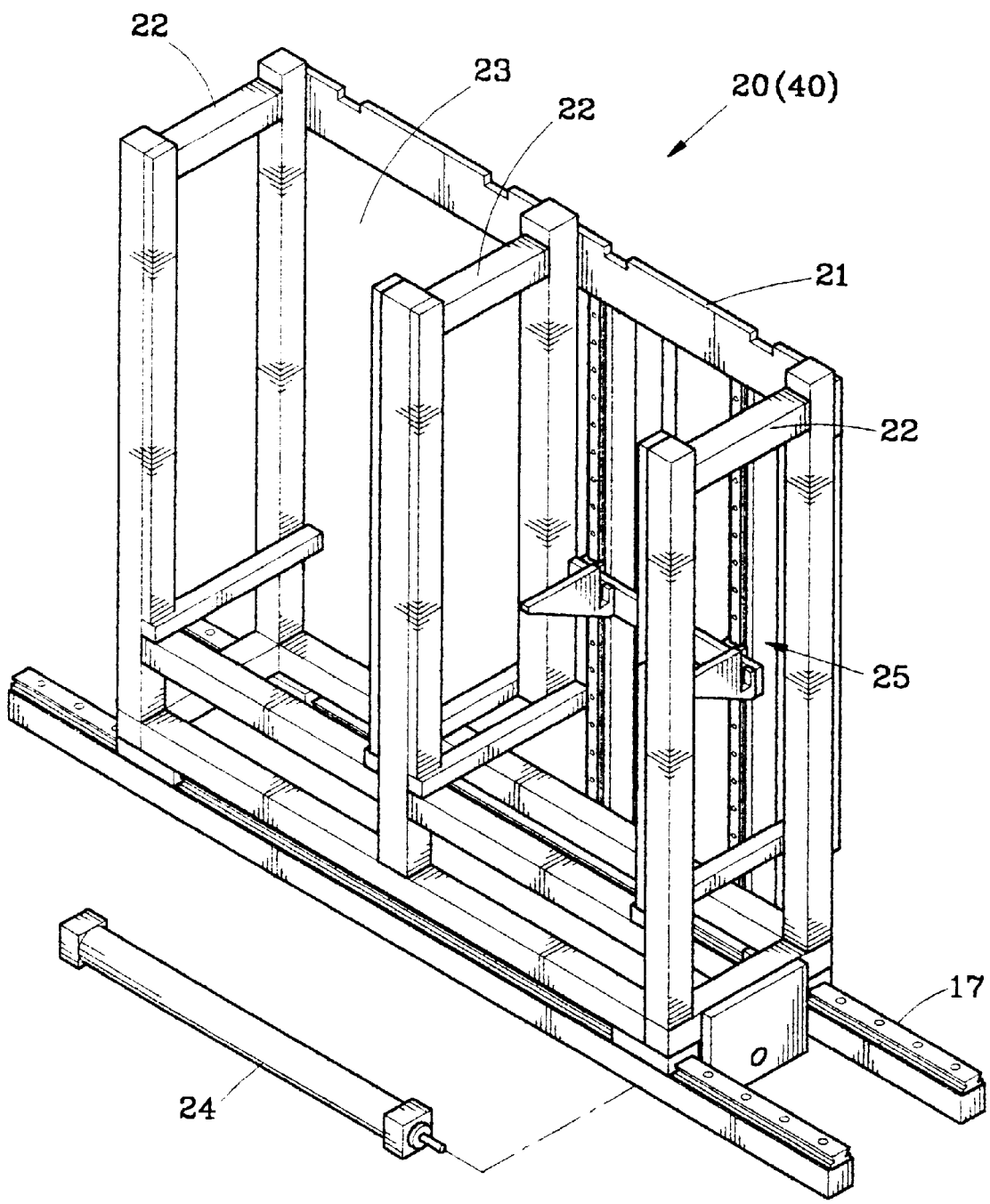
FIG. 3 is a perspective view showing the keyboard supply cart adapted in the keyboard etching apparatus of the present invention.

As shown in FIG. 3, the keyboard supply cart 20 has a bottom side engaged and guided by two rails 17 and is movable along the rails 17 by being driven by a power cylinder 24 disposed between the two rails 17. The keyboard supply cart 20 comprises a longitudinal rack section 21, a plurality lateral rack sections 22 and lifting devices 25. The longitudinal rack section 21 is arranged to be substantially parallel with the rails 17 and the lateral rack sections 22 are mounted to the longitudinal rack section 21 and extending therefrom in a direction substantially normal to the longitudinal rack section 21 and spaced from each other so as to define a number of U-shaped racks, each having an interior space 23 between two successive lateral rack sections 22. The interior space 23 is sized to receive therein a stack of keyboards (not shown in FIG. 3) in a vertical direction. Each of the interior spaces 23 has a lifting device 25 disposed therein for supporting and moving the stack of keyboards in the vertical direction.

Figure 4:
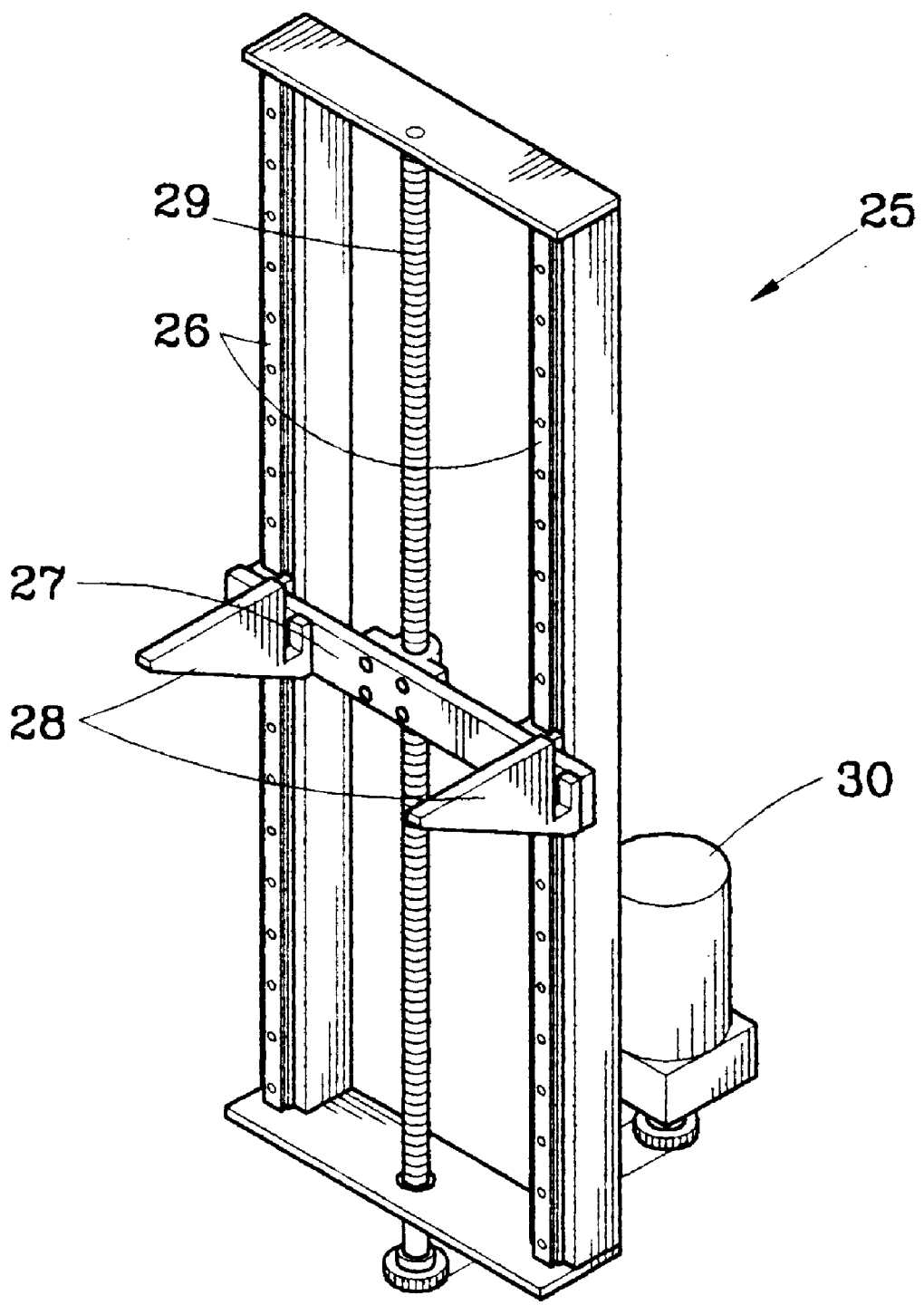
FIG. 4 is a perspective view showing the lifting device mounted in the keyboard supply cart of the present invention.

The lifting device 25 is particularly shown in FIG. 4, comprising two upright rails 26 arranged at the bottom of the respective U-shaped rack that defines the interior space 23 receiving the lifting device 25 and extending in the vertical direction and a vertically-extending screw rod 29 located between the two rails 26 and rotatable by means of a motor 30. A slide 27 straddles between the two rails 26 and is guided thereby to move along the rails 26. The slide 27 is coupled to the screw rod 29 by means of threading engagement therebetween to be driven to move up and down in the vertical direction along the rails 26. The slide 27 has two arms 28 extending therefrom toward the opening of the U shape of the respective rack for supporting thereon the stack of keyboards (not shown). The arms 28, together with the keyboards supported thereon, are moved by the screw 29 by being driven by the motor 30 so as to position the top one of the keyboards in the stack at a level relative to the machine frame 11 so as to allow the keyboard to be picked up the grasping mechanism 50. For the keyboard collecting cart 40, the arms 28 are also driven by the motor 30 to be positioned at a desired altitude in order to receive the keyboard that has been etched from the grasping mechanism 50 for stacking the etched keyboards on the arms 28 of the keyboard collecting cart 40 within the interior space 23 in the keyboard collecting cart 40.

Figure 5:
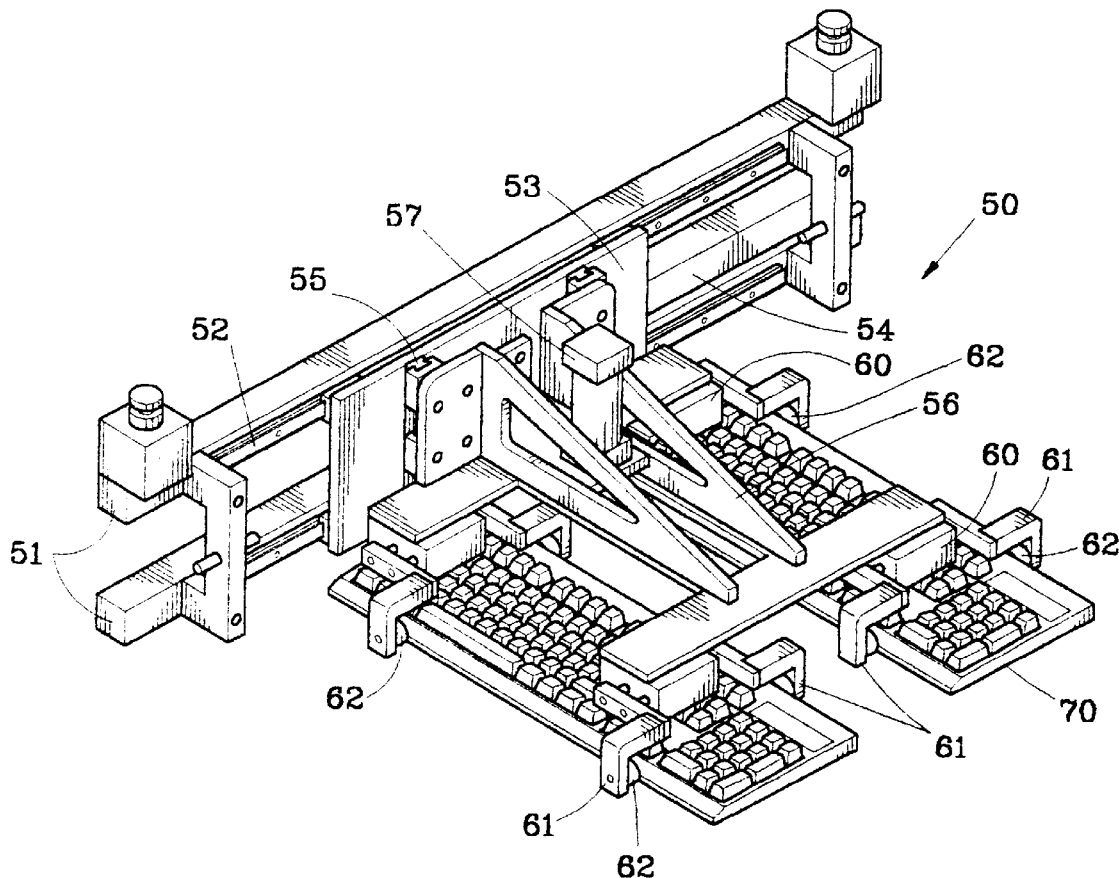
FIG. 5 is a perspective view showing the grasping mechanism constructed in accordance with the present invention; and, FIG. 5A is an enlarged view of a portion of the grasping mechanism of FIG. 5.
Figure 5A:
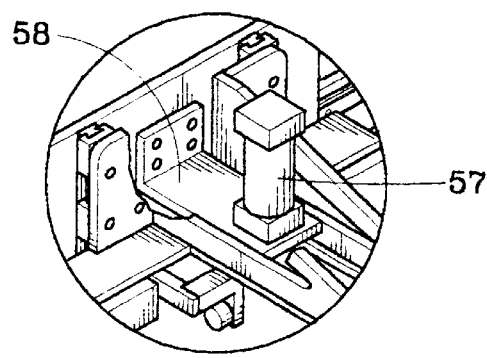

The grasping mechanism 50, as shown in FIG. 5 and FIG. 5A, comprises two elongated rail fixtures 51 spaced from and parallel with each other, each having a rail 52 fixed thereon and substantially co-extensive therewith, a slide 53 movable along the rails 52, two arms 56 fixed to and extending from the slide 53, preferably in a direction normal to the rails 52 and two elongated pick-up supports 59 fixed to the arms 56 and extending in a direction substantially parallel with the rails 52, each having two opposite ends on each of which a pick-up assembly is mounted.

As shown in FIG. 5, the rail fixtures 51 are fixed to the machine frame 11 and extending in a horizontal direction to support the rails 52 extending in the horizontal direction and parallel with and spaced from each other. A power cylinder 54 is disposed between the two rails 52 to drive the slide 53 which is slidably mounted on the rails 52 to move along the rails 52 and thus providing a horizontal movement of the grasping mechanism 50 relative to the machine frame 11.

The slide 53 comprises a plate having vertically-extending rails 55 mounted thereon to be spaced from each other. A cylinder support plate 58 is fixed to the slide 53 between the two rails 55 and extending therefrom to support thereon a power cylinder 57. Each of the arms 56 is slidably mounted to one of the rails 55 and extending therefrom with the pick-up supports 59 fixed to a lower side thereof to be spaced from each other. Preferably, the two pick-up supports 59 are located at two opposite ends of the arms 56 as shown. The arms 56 and the pick-up supports 59 are coupled to the power cylinder 57 to be driven thereby to move along the rails 55 so as to provide the grasping mechanism 50 a vertical movement relative to the machine frame 11.

As shown in FIG. 5, the pick-up assembly that is mounted at each of the two ends of each of the pick-up supports 59 comprises two L-shaped pick-up members 61, each having two branches one of which is slidably mounted to the respective pick-up support 59 with another branch extending downward and opposite to and spaced from each other and a power cylinder 60 for synchronously driving the two L-shaped members to move relative to the each other in a direction parallel with the length of the pick-up support 59 so as to change the distance between the two opposite L-shaped members 61, allowing a keyboard to be pinched between and thus picked up by the oppositely arranged, downward extending branches of the L-shaped members 61. A cushion member 62 is provided on the downward extending branch of each of the L-shaped members 61 to protect the keyboard 70 from being damaged during the pick-up operation. Thus, by having the power cylinders 60 extend/retract simultaneously to drive the pick-up members 61 synchronously, the keyboard 70 may be firmly pinched and picked up.

The pick-up assemblies on the ends of the two pick-up supports 59 at the same side constitute a pick-up group which allows a keyboard 70 to be held at two spaced positions corresponding to the two pick-up supports 59. The pick-up assemblies on the opposite ends of the pick-up supports 59 allows two keyboards 70 to be picked up at the same time, as shown in FIG. 5.

The operation of the keyboard etching apparatus 10 in accordance with the present invention will be now described. With reference to FIGS. 1, 2 and 5, as mentioned previously, the keyboard supply cart 20 and the keyboard collecting cart 40 that are arranged on two opposite sides of the machine frame 11 are driven to move along the rails 17 fixed on the base 12, as indicated by arrow A in FIG. 1. In picking up one of the keyboards that are held within one of the interior spaces 23 in the keyboard supply cart 20, the keyboard supply cart 20 is moved to such a position as to have the interior space 23 corresponding in spatial relation to one pick-up group of the pick-up assemblies of the grasping mechanism 50 and the lifting device 25 associated therewith raises the keyboards 70 supported thereon to position the uppermost one of the keyboards 70 at a desired level to be picked up by the grasping mechanism 50 so that by moving the pick-up group downward by means of the power cylinder 57, the pick-up members 61 are brought to be located at two opposite sides of the uppermost keyboard 70 and by further actuating the power cylinders 60, the pick-up members 61 pinch and thus pick up the keyboard 70.

In a pick-up operation cycle, under the assumption that there has already been a keyboard positioned within the keyboard tray 15, the grasping mechanism 50 is moved along the rails 52 by the power cylinder 54 to a position where one of the pick-up groups opposes one of the interior spaces 23 of the keyboard supply cart 20 in which keyboards to be picked up are stacked up and the other one of the pick-up groups opposes the keyboard tray 15. The power cylinder 5 is now actuated to drive the pick-up supports 59, together with the pick-up members 61 thereon, downward to such a position where the pick-up members 61 of one of the pick-up groups are located at two opposite sides of the uppermost keyboard inside the keyboard supply cart 20 which contains a number of non-etched, blank keyboards and those of the other group at two opposite sides of the keyboard in the keyboard tray 15 which has already been etched in this case. By simultaneously actuating the power cylinders 60, the two keyboards are pinched and picked up at the same time. Thereafter, the power cylinder 57 is actuated in a reversed direction to lift the pick-up supports 59, together with the keyboards 70 picked up thereby, and then the grasping mechanism 50 is driven by the power cylinder 54 to such a position where the one of the pick-up groups that picked up the uppermost blank keyboard from the keyboard supply cart 20 is now opposing the keyboard tray 15 and the other one of the pick-up groups that picked up the etched keyboard from the keyboard tray 15 is now opposing one of the interior spaces 23 of the keyboard collecting cart 40. By lowering down the pick-up supports 59 by the power cylinder 57 and then releasing the power cylinders 60, the blank keyboard and etched keyboard are now respectively positioned into the keyboard tray 15 and the interior space of the keyboard collecting cart 40.

The laser 14 may now be actuated to perform etching operation on the blank keyboard held in the keyboard tray 15. Thereafter, the pick-up operation as described above is carried out again to move the etched keyboard from the keyboard tray 15 to the keyboard collecting cart 40 and move a new blank keyboard from the keyboard supply cart 20 to the keyboard tray 15. This is cyclically and periodically performed until all the keyboards contained within the interior space 23 of the keyboard supply cart 20 undergo etching operation and are moved to the keyboard collecting cart 40.

Once the keyboards inside the one of the interior spaces 23 of the keyboard supply cart 20 have already been moved to the keyboard collecting cart 40, the keyboard supply cart 20 may be moved by the power cylinder 24, see FIG. 3, along the rails 17 to a position where a next one of the interior spaces 23 takes the place of the previous interior space. The pick-up and etching operation may thus continues without any interruption. Similarly, once the interior space 23 of the keyboard collecting cart 40 is full, the keyboard collecting cart 40 may be moved by the power cylinder 24 to have a next, empty interior space to take the place of the already full interior space.

Further, during the operation of the apparatus 10, the operator may selectively supply new blank keyboards into any empty interior spaces 23 of the keyboard supply cart 20 and remove the keyboards from any interior spaces of the keyboard collecting cart that are full of the etched keyboards. This allows the apparatus 10 to be operated in a continuous and almost non-stopped manner.

In accordance with the present invention, the apparatus 10 may be controlled by a computer or a micro-processor based controller so that the operation sequence of the apparatus 10 may be controlled and adjusted by suitable programming. This reduces errors and influence of human factor on the operation of the apparatus. This also allows the characters/ marks to be formed on the keyboards to be modified as desired and makes the apparatus suitable for keyboards of different specifications.

Since the apparatus 10 may operates fully automatically, no human interposition is needed at all. Thus, the risk of body damage is significantly decreased. Further, such a fully automatic operation also provides a high precision and high efficiency production of the keyboard etched.

The above description is made with respect to the preferred embodiment of the present invention and for those skilled in the art, it is possible to made a variety of modifications and changes to the above-described embodiment without departing from the scope and spirit of the present invention. All these modifications and changes should be considered within the scope of the present invention as defined in the appended claims.

What is claimed is:

1. A keyboard etching apparatus comprising a base on which a frame is fixed to support a laser beam source and a keyboard tray thereon, the laser beam source and the keyboard tray being spaced from each other in such a manner to allow a laser beam emitted from the laser beam source to project onto a keyboard removably supported on the keyboard tray so as to perform an etching operation on the keyboard, the improvement comprising:

a. a keyboard supply device having a plurality of non-etched keyboards held therein, the keyboard supply device including a cart displaceably mounted on rails on a first side of the frame and movable by a first power cylinder coupled thereto:

b. a keyboard collecting device for receiving etched keyboards therein, the keyboard collecting device including a cart displaceably mounted on rails on a second side of the frame and movable by a second power cylinder coupled thereto: and, c. a conveyor system being arranged between the keyboard supply device and the keyboard collecting device for sequentially moving each of the non-etched keyboards received from the cart of the keyboard supply device to the keyboard tray to be etched by the laser beam and to simultaneously move an etched keyboard from the keyboard tray to the cart of the keyboard collecting device to be collected therein.

2. The keyboard etching apparatus as claimed in claim 1, further comprising a gas exhausting tube having an inlet opening facing the space between the laser beam source and the keyboard tray to remove and expel un-desired gas generation during etching operation.

3. The keyboard etching apparatus as claimed in claim 1, wherein each cart respectively comprises a first rack section and a plurality of second rack sections mounted to the first rack to be substantially perpendicular thereto so as to define a plurality of U-shaped racks, each comprising an interior space for receiving keyboards therein, each of the U-shaped racks comprising a lifting device for lifting/lowering down the keyboard therein so as to allow an uppermost one of the keyboards to be located at a predetermined level.

4. The keyboard etching apparatus as claimed in claim 3, wherein the lifting device comprises two spaced guiding rails fixed on bottom of the U shape of the rack with a screw rod disposed therebetween to be driven by a motor, a slide straddling over and guided by the rails, the slide being in driving coupling with the screw to be driven thereby and moving along the guiding rails, the slide comprising a plurality of arms extending therefrom to support the keyboards thereon so that the rotation of the screw moves the keyboards in such a direction to have the uppermost keyboard located at the predetermined level.

5. The keyboard etching apparatus as claimed in claim 1, wherein the conveyor system comprises a first rail system extending between the keyboard supply device and the keyboard collecting device and a first slide movable along the first rail system by being driven by a power cylinder, the first slide having an outer surface on which a second rail system is mounted to be substantially normal to the first rail system, second slide means movable along the second rail system by being driven a power cylinder, the second slide means comprising a plurality of pick-up devices spaced from each other to be engageable with different portions of a keyboard so as to pick up the keyboard.

6. The keyboard etching apparatus as claimed in claim 5, wherein the second slide means comprises a plurality of pick-up supports spaced from each other and each having at least one of the pick-up devices mounted thereon and wherein each of the pick-up device comprises two L-shaped members having a first branch movably mounted on the respective pick-up support to have a second branch opposite to and spaced from each other, the L-shaped members being driven by a power cylinder to change the spacing between the second branches of the L-shaped members so as to get into contact engagement with two opposite sides of the keyboard and thus pinch and pick up the keyboard.

7. The keyboard etching apparatus as claimed in claim 6, wherein the second branch of each of the L-shaped members comprises a cushion device fixed thereon to provide a protective contact engagement with the keyboard.

8. The keyboard etching apparatus as claimed in claim 6, wherein each of the pick-up supports comprises two pick-up devices mounted thereon and spaced from each other at a predetermined distance to simultaneously pick up two keyboards.

9. The keyboard etching apparatus as claimed in claim 8, wherein the keyboard supply device and the keyboard collecting device are so arranged at two opposite sides of the frame so that a pre-determined distance is present between the keyboard supply device and the keyboard tray and between the keyboard tray and the keyboard collecting device and wherein the distance between the two pick-up devices on the pick-up support is corresponding to the distance between the keyboard supply device and the keyboard tray or between the keyboard tray and the keyboard collecting device so as to allow the pick-up devices to simultaneously pick up a keyboard from the keyboard supply device and the keyboard in the keyboard tray and to simultaneously position the keyboard that is picked up from the keyboard supply device and the keyboard that is picked up from the keyboard tray onto the keyboard tray and the keyboard collecting device.

\* \* \* \* \*